US012594533B2

(12) United States Patent
Gnanasekaran et al.

(10) Patent No.: US 12,594,533 B2
(45) Date of Patent: Apr. 7, 2026

(54) APPARATUS FOR DISTRIBUTING FLUID IN DOWNFLOW REACTORS

(71) Applicant: HINDUSTAN PETROLEUM CORPORATION LIMITED, Mumbai (IN)

(72) Inventors: Valavarasu Gnanasekaran, Bengaluru (IN); Pradyut Kumar Dhar, Bengaluru (IN); Samuel Jedidiah Mekala, Bengaluru (IN); Bojja Ramachandra Rao, Bengaluru (IN)

(73) Assignee: Hindustan Petroleum Corporation Limited, Mumbai (IN)

( * ) Notice: Subject to any disclaimer, the term of this patent is extended or adjusted under 35 U.S.C. 154(b) by 776 days.

(21) Appl. No.: 17/916,483

(22) PCT Filed: Mar. 11, 2021

(86) PCT No.: PCT/IB2021/052028
§ 371 (c)(1),
(2) Date: Sep. 30, 2022

(87) PCT Pub. No.: WO2021/198818
PCT Pub. Date: Oct. 7, 2021

(65) Prior Publication Data
US 2023/0149874 A1 May 18, 2023

(30) Foreign Application Priority Data
Mar. 31, 2020 (IN) .............................. 202021014414

(51) Int. Cl.
*B01J 8/02* (2006.01)

(52) U.S. Cl.
CPC ............. *B01J 8/025* (2013.01); *B01J 8/0278* (2013.01); *B01J 2208/0092* (2013.01); *B01J 2208/00929* (2013.01); *B01J 2208/00938* (2013.01)

(58) Field of Classification Search
CPC ..... B01J 8/00; B01J 8/02; B01J 8/0242; B01J 8/025; B01J 8/0278; B01J 8/04;
(Continued)

(56) References Cited

U.S. PATENT DOCUMENTS 4,933,047 A * 6/1990 Bannon .................. B01D 3/205
                                                           196/136
7,473,405 B2 * 1/2009 Kemoun ................ B01J 8/1818
                                                           422/220
(Continued)

FOREIGN PATENT DOCUMENTS

EP 3 530 349 A1 8/2019
WO 044265 A2 4/2006

*Primary Examiner* — Natasha E Young
(74) *Attorney, Agent, or Firm* — Bradley Arant Boult Cummings LLP

(57) ABSTRACT

The present subject matter relates an apparatus (120) for distributing polyphasic fluid mixture to a catalyst bed in a downflow reactor (100). The apparatus (120) comprises a distributor tray (140) comprising a plurality of distributor units (150). The distributor unit (150) comprises an inner tube (210), an outer tube (220) disposed outside and concentric to the inner tube (210), a cover (346), a cap plate (350), and a gas inlet (358). The inner tube comprises a first aperture (314) to allow liquid to enter the inner tube (210) and a solid insert (326). The solid insert (326) forms a narrow passage (330). The outer tube (220) comprises a slot (338) to allow liquid from the distributor tray (140) to enter an annular portion (342).

20 Claims, 8 Drawing Sheets

(58) Field of Classification Search
CPC ...... B01J 8/0446; B01J 8/0461; B01J 8/0469;
B01J 8/0492; B01J 10/00; B01J 10/007;
B01J 2208/00; B01J 2208/00796; B01J
2208/00893; B01J 2208/0092; B01J
2208/00929; B01J 2208/00938
See application file for complete search history.

(56) References Cited

U.S. PATENT DOCUMENTS

| | | | | |
|---|---|---|---|---|
| 7,506,861 | B2 * | 3/2009 | Muller | B01J 8/0492 |
| | | | | 261/114.5 |
| 8,695,953 | B2 * | 4/2014 | Xu | B01J 8/0492 |
| | | | | 261/114.5 |
| 2011/0081282 | A1 | 4/2011 | Parimi et al. | |
| 2012/0138175 | A1 | 6/2012 | Xu et al. | |
| 2013/0180595 | A1 | 7/2013 | Naunheimer | |

* cited by examiner

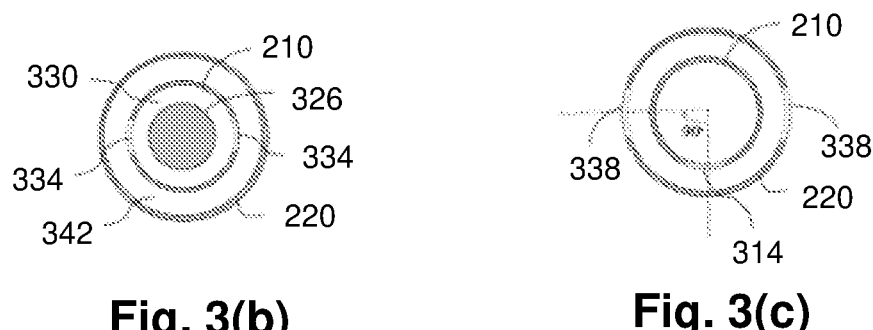
Fig. 3(b)              Fig. 3(c)
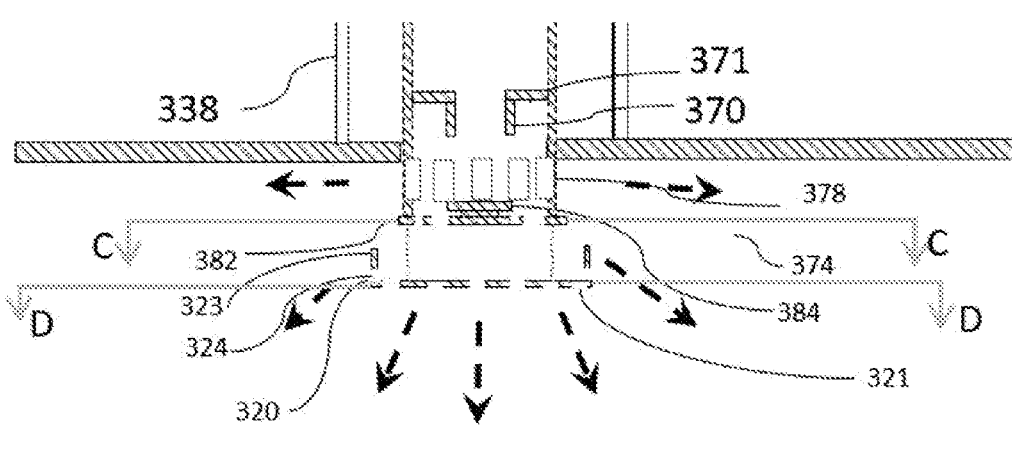
Fig. 3(d)
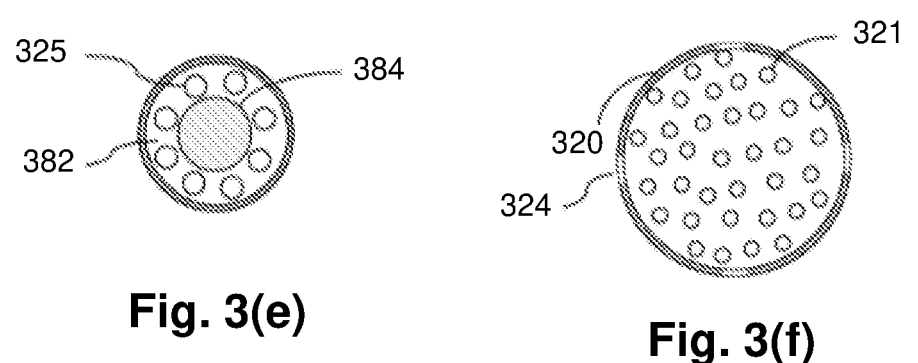
Fig. 3(e)              Fig. 3(f)

APPARATUS FOR DISTRIBUTING FLUID IN DOWNFLOW REACTORS

This application is a U.S. National Stage Entry of International Patent Application Serial Number PCT/IB2021/052028, now WO 2021/198818, filed Mar. 11, 2021, which claims priority to Indian Patent Application No. IN202021014414, filed Mar. 31, 2020, the entire contents of all of which are incorporated herein by reference.

TECHNICAL FIELD

The present subject matter relates in general to downflow reactors and in particular to an apparatus for distributing a polyphase fluid mixture to a catalyst bed in downflow reactors.

BACKGROUND

Reactors used in chemical, petroleum refining, and other industries generally have a fluid passing through a catalyst bed for performing various types of processes such as cracking, hydrotreating, etc. The fluid may be a polyphasic mixture of gas and liquid. In a downflow reactor, the gas and liquid flow in a concurrent manner from the top of the reactor to the bottom of the reactor. To ensure complete and efficient utilization of the catalyst, it is necessary for the gas and liquid mixture to be distributed throughout the catalyst bed. Generally, distribution of fluid in the reactor is achieved by using distributor plates or distributor trays. These distributors may be a plate with orifices with the distributor plate placed above the catalyst bed so that the fluid passes through the distributor plate before entering the catalyst bed.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components where possible.

FIG. 3(*b*) illustrates a top view of a section along the line A-A of the example distributor unit illustrated in FIG. 3(*a*), in accordance with an embodiment of the present subject matter.

FIG. 3(*c*) illustrates a top view of a section along the line B-B of the example distributor unit illustrated in FIG. 3(*a*), in accordance with an embodiment of the present subject matter.

FIG. 3(*d*) illustrates an enlarged view of an example dispersion section 374, in accordance with an embodiment of the present subject matter.

FIG. 3(*e*) illustrates a top view of a section along the line C-C of the example distributor unit illustrated in FIG. 3(*d*), in accordance with an embodiment of the present subject matter.

FIG. 3(*f*) illustrates the top view of a section along the line D-D of the example distributor unit illustrated in FIG. 3(*d*), in accordance with an embodiment of the present subject matter.

FIG. 4(*b*) illustrates a top view of a section along the line A-A of the example distributor unit illustrated in FIG. 4(*a*), and FIG. 4(*c*) illustrates a top view of a section along the line B-B of the example distributor unit illustrated in FIG. 4(*a*), in accordance with an embodiment of the present subject matter.

FIG. 4(*d*) illustrates another example distributor unit comprising a static mixer, in accordance with an embodiment of the present subject matter.

FIG. 5(*b*) illustrates a top view of a section along line A-A of the example distributor unit shown in FIG. 6(*a*), in accordance with an embodiment of the present subject matter.

DETAILED DESCRIPTION

Figure 1:
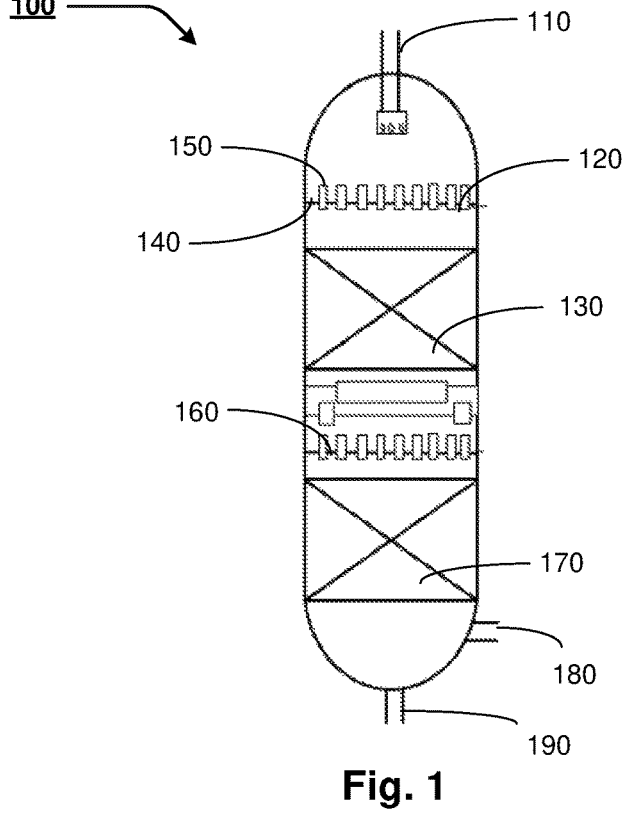
FIG. 1 illustrates an example downflow reactor comprising an example apparatus for distributing a polyphasic liquid mixture, in accordance with an embodiment of the present subject matter.

The present subject matter relates in general to downflow reactors and in particular to an apparatus for distributing a polyphase fluid mixture to a catalyst bed in downflow reactors.

In a downflow reactor, fluid having reactants enters from the top of the reactor and products are removed from the bottom of the reactor. The fluid may be polyphasic, comprising at least one liquid phase reactant and one gas phase reactant. Gas and liquid reactants are mixed and passed over a catalyst bed for performing several processes such as hydrotreating, cracking, desulfurization, etc. When the mixture is passed over the catalyst, it is important that the gas-liquid mixture is distributed uniformly over the catalyst bed to ensure efficient utilization of the catalyst. Efficient utilization of the catalyst is important for ensuring a uniform rate of reaction, increasing productivity, and yield. This may also allow increased use of catalyst before regeneration or replenishment. Furthermore, in hydroprocessing reactors involving exothermic reactions, uneven distribution of liquid or gas can lead to excess release of heat in certain regions compared to other regions. The high temperatures further accelerate the reaction rate, resulting in development of hot spots in the reactor, reducing the overall catalyst life.

Generally, distribution of gas and liquid over the catalyst bed is achieved using a distributor plate or distributor tray. Typically, a sieve plate distributor plate and a chimney distributor is used to distribute the gas and liquid reactants over the catalyst bed. The sieve tray distributor plate may be a plate with orifices that is placed over the catalyst bed horizontally. Conventional sieve tray distributor plates have orifices on a plate through which liquid and gas flows. Gas and liquid pass through the orifices and enter the catalyst bed. Since the orifices are spread throughout the plate, it helps with distribution of the gas-liquid mixture. However, the distribution of fluid through these plates is even if the plate is not completely level. The plate may go out of level over time, i.e., the plate may get inclined such that one side of the plate may be at a slightly lower level than another side. In such cases, more fluid flows through the portion of the plate that is at a lower level than the portion of the plate that is at a higher level. In other words, the plate is very sensitive to out-of-levelness. Conventional chimney distributors include pipes (called downpipes), which pass through orifices on the distributor plate. The gas enters the downpipes from near the top end of the downpipes and flows downwards through the pipes. The liquid collects over the tray and enters the downpipes through smaller apertures on the side of the downpipe and then flows downwards with the gas. The minimum size of these apertures on the side of the downpipe is about 6 mm. The apertures are susceptible to clogging when the liquid is sludgy, turbid, or has scales, requiring that the distributor plate be removed and cleaned. This increases reactor downtime and increases operational costs.

In addition, conventional distributors require a large number of orifices and specific designs to ensure uniform distribution. If the distributor plate becomes out-of-level, it results in some regions of the catalyst bed receiving more of the gas-liquid mixture than in other regions, making for non-uniform distribution of the fluid over the catalyst bed. In exothermic reactions, if the distributor plate does not provide uniform distribution of fluid to the catalyst bed, for example because of the distributor plate being not level, there is poor heat exchange, which leads to the formation of hot spots in the catalyst bed. This reduces reaction rate and reduces product yield.

The present subject matter overcomes these, and other problems associated with current distributors in downflow reactors. The present subject matter relates to an apparatus for distributing a polyphase fluid mixture over a catalyst bed in a downflow reactor. The apparatus comprises a distributor tray comprising a plurality of distributor units.

In one implementation, a distributor unit comprises an inner tube disposed on an orifice in the distributor tray. The inner tube comprises a first aperture disposed on a side portion of the inner tube to allow liquid to enter the inner tube. A solid insert is disposed in a top portion of the inner tube, the outer diameter of the solid insert being smaller than the inner diameter of the inner tube. The solid insert results in formation of a narrow passage around it in the top portion of the inner tube to allow gas to pass through. An outer tube is disposed concentric to the inner tube forming an annular portion between the inner tube and the outer tube. The outer tube comprises a slot disposed on a bottom portion of the outer tube. The slot allows liquid from the distributor tray to enter the annular portion between the inner tube and the outer tube. A ring-like cover is disposed on a top portion of the inner tube inside the outer tube to enclose the annular portion on the top while leaving the top end of the inner tube open to allow entry of gas. A support structure is disposed on the outer tube at its top portion to extend over the outer tube and a gas inlet is disposed on the support structure to allow gas to enter the distributor unit. The top end of the support structure is covered by a cap plate disposed on the support structure. The gas thus enters the inner tube through the support structure and mixes with the liquid that enters the inner tube through the first aperture. In an example, a venturi insert may be disposed within the inner tube and below the first aperture to further facilitate mixing of liquid and gas.

The apparatus of the present subject matter allows improved distribution of the liquid-gas mixture to the catalyst bed compared to conventional distributor trays. During operation, gas flows via the narrow passage in the inner tube at high velocity causing reduced pressure. This allows liquid entering via the slots in the outer tube to rise in the annular region. Thus, because the liquid flow is dependent on gas flow, the apparatus of the present subject matter has low sensitivity to out-of-levelness of the distributor tray. Hence, even if the distributor tray is not level, fluid flow to the catalyst bed is uniform. The apparatus can be used over a wide range of fluid flow regimes by changing the size of the solid insert in the inner tube. For example, in low gas flow conditions, the narrow passage may be made narrower than in a high gas flow condition, increasing gas velocity and thus providing a greater pressure drop, which increases the amount of liquid entering via slots in the outer tube and the height to which the liquid rises in the annular portion. This increases the dependence of liquid flow on gas flow, even in low gas flow conditions. This is advantageous in low gas flow conditions, as the low pressure can be created in the annular portion using the solid insert, resulting in lower sensitivity to out of levelness. As will be understood, low gas flow conditions and high gas flow conditions may correspond to different gas flow rates used in the reactor, which may depend on reactor configuration and processing parameters.

As the liquid travels first into the slot in the outer tube and then into the first aperture or a second aperture disposed above the first aperture in the inner tube, where the apertures are placed 90° away on a circumference of the inner tube from the slot, solid particles present in the liquid will deposit on the distributor tray. This prevents clogging of the apertures leading to longer use of the distributor tray between maintenance compared to conventional distributors. This reduces reactor downtime and leads to reduced operating costs. The venturi insert disposed in the inner tube allows greater mixing of gas and liquid before the mixture enters the catalyst bed. In an example, there may be a static mixer disposed near the exit of the inner tube, which improves mixing further. The enhanced mixing improves reaction rate and thus the product yield. Furthermore, the apparatus allows even liquid flow exiting the inner pipe even if the liquid flow to the distributor plate is uneven or is pulsed.

In another embodiment, the distributor unit comprises a tube disposed on the distributor tray. A first aperture is disposed on a lower portion of the tube near the distributor tray to allow liquid to enter the distributor unit. A solid insert is disposed within the tube so that a lower portion of the *soli* insert is adjacent to the first aperture. The lower portion of the solid insert has corrugated edges and an upper portion of the solid insert has rounded edges. A cap plate is disposed on a support structure disposed on the tube and a gas inlet is disposed on the support structure to allow gas to enter the distributor unit.

Aspects of the present subject matter are further described in conjunction with the appended figures. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and implementations of the present subject matter, as well as specific examples thereof, are intended to encompass equivalents thereof.

FIG. 1 illustrates an example downflow reactor comprising an example apparatus for distributing a polyphasic liquid mixture, in accordance with an embodiment of the present subject matter. The downflow reactor 100 comprises a fluid inlet 110. The fluid may comprise a mixture of gas and liquid. The fluid passes through an apparatus 120 for distributing the mixture and enters the catalyst bed 130, where catalytic hydroprocessing reactions, such as hydrotreating, cracking, etc., occur. The apparatus 120 may be a distributor tray 140 comprising a plurality of distributor units 150. In an example, after the reactions are complete, the resulting products may pass through a second apparatus 160 for distributing the product mixture to a second catalyst bed 170. The second apparatus 160 may be the same as the apparatus 120 or may be a conventional distributor. The product gas and liquid may be removed from the bottom of the reactor from a gas outlet 180 and a liquid outlet 190.

Figure 2:
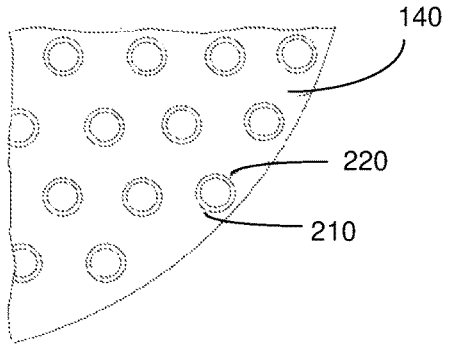
FIG. 2 illustrates a top view of a section of an example distributor tray comprising a plurality of distributor units, in accordance with an embodiment of the present subject matter.

FIG. 2 illustrates a top view of a section of an example distributor tray comprising a plurality of distributor units, in accordance with an embodiment of the present subject matter. The distributor tray 140 comprises a plurality of distributor units 150, referred to singly as distributor unit 150. The plurality of distributor units 150 may be disposed in any arrangement on the distributor tray depending on the required flow characteristics. In an example, the plurality of distributor units 150 may be arranged in a triangular pitch. The distributor unit 150 comprises an inner tube 210 and an outer tube 220 concentric to the inner tube.

Figure 3A:
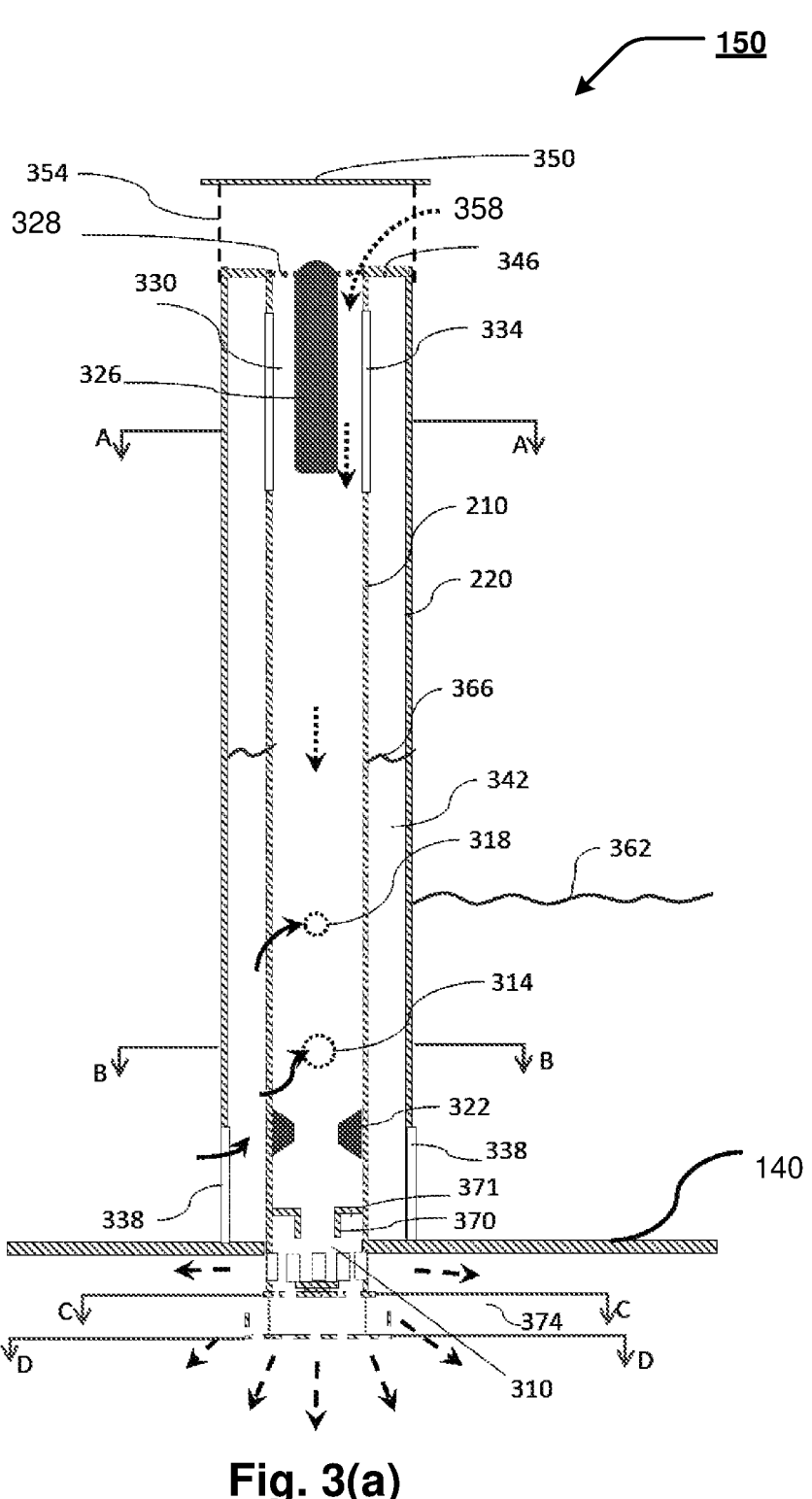
FIG. 3(*a*) illustrates a cross-section of an example distributor unit in accordance with an embodiment of the present subject matter.
Figure 4A:
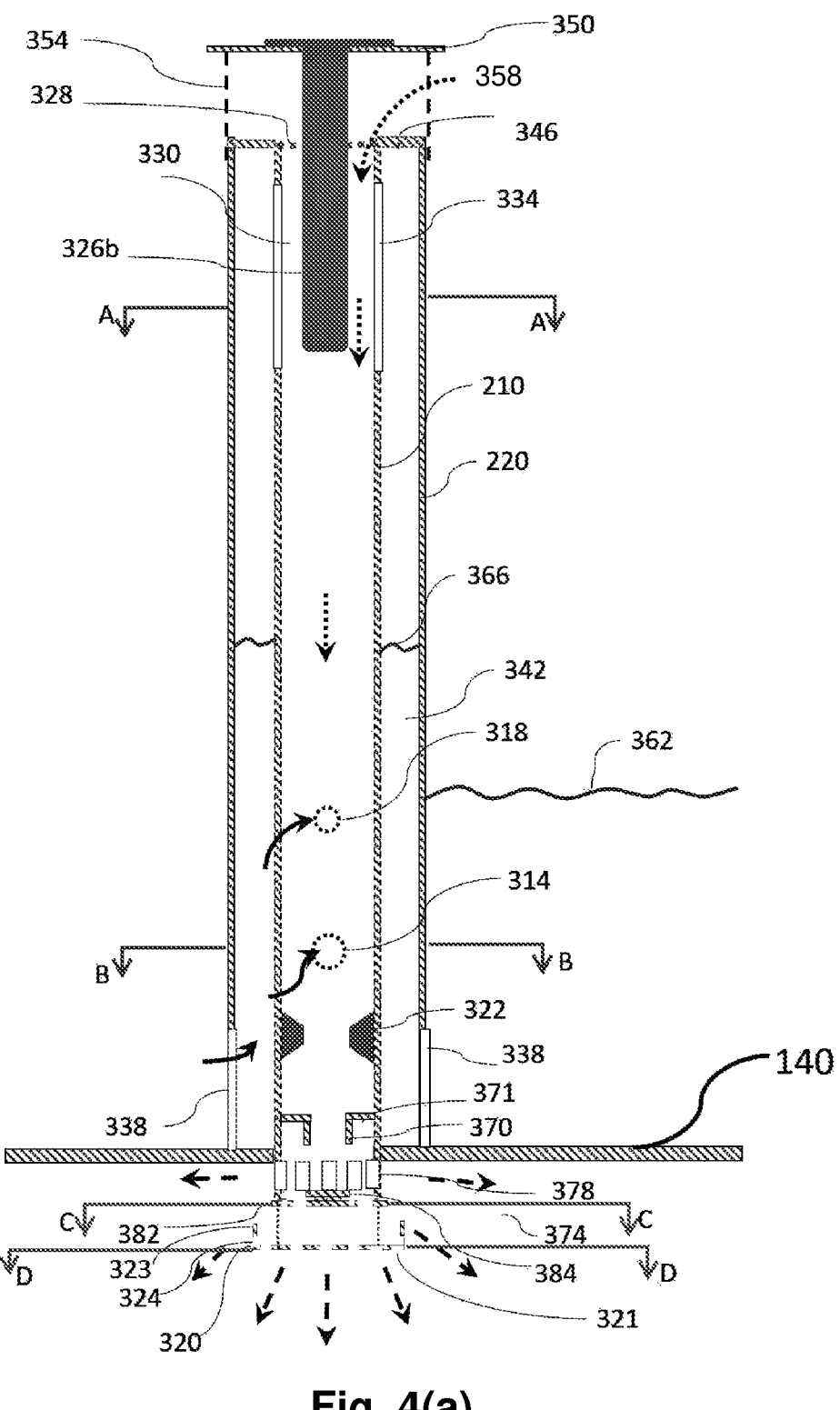
FIG. 4(*a*) illustrates another example distributor unit comprising the solid insert attached to the cap plate, in accordance with an embodiment of the present subject matter.
Figure 4B:
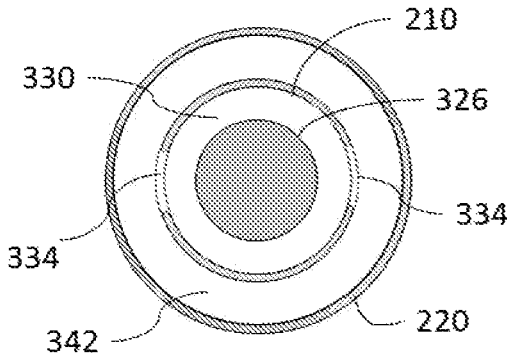
Figure 4C:
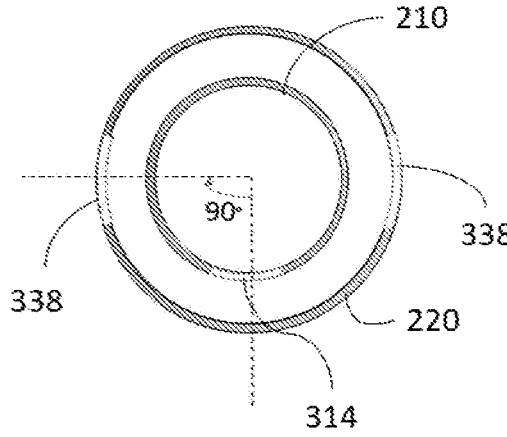
Figure 4D:
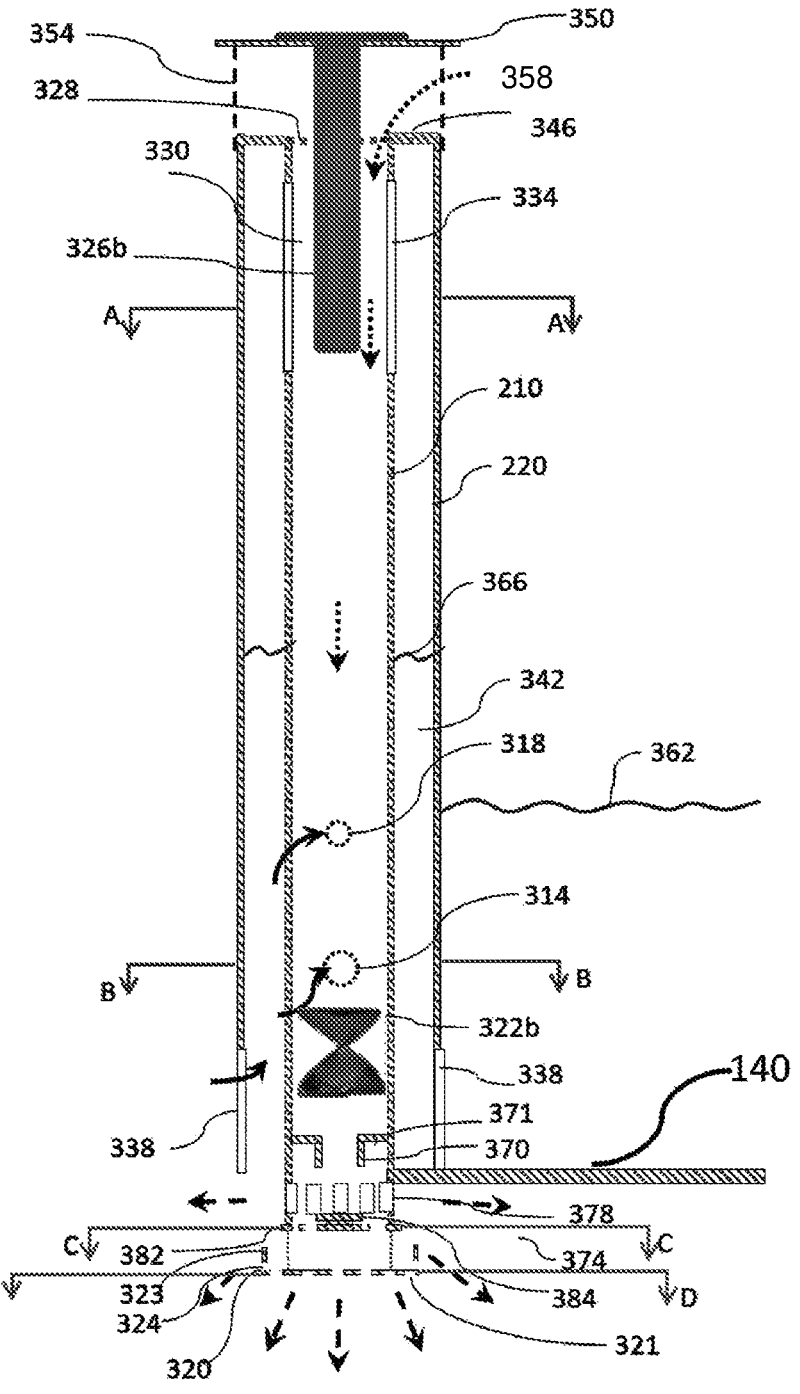

FIG. 3(*a*) illustrates a cross-section of an example distributor unit, in accordance with an embodiment of the present subject matter. The distributor unit 150 comprises an inner tube 210 disposed vertically on an orifice 310 of the distributor tray 140. The inner tube 210 comprises a first aperture 314 disposed on a side portion of the inner tube 210 at a height above the distributor tray 140 to allow liquid to enter the inner tube 210. In another example, the inner tube 210 may comprise two first apertures 314, with the two first apertures 314 disposed 180° from each other on a circumference on the inner tube 210 at the same height. In an example, a second aperture 318 may be disposed on a side portion of the inner tube 210 above the first aperture 314. In another example, the inner tube 210 may comprise two second apertures 318 disposed 180° from each other on the circumference on the inner tube 210. In various examples, the first aperture 314 and the second aperture 318 may have a circular cross-section or cross-section of other shapes. The apertures 314 and 318 may be sized to offer required resistance to liquid flow, depending on the operational characteristics of the reactor 100.

A venturi insert 322 may be disposed within the inner tube 210 below the first aperture 314. In another example, a static mixer (not shown in the figure) may be disposed below the venturi insert 322. The static mixer may comprise twisted ribbons, in an example. The inlet to the venturi insert 322 is placed such that the liquid entering the inner tube 210 from the first aperture 314 enters the venturi insert 322 and further mixes with the incoming gas that comes in from the top of the inner tube 210.

A solid insert 326 may be disposed coaxially on a top portion of the inner tube 210. In an example, the solid insert 326 may be cylindrical in shape with a hemispherical top portion and smooth edges on the bottom portion. The solid insert 326 forms a narrow passage 330 around it in the inner tube 210, where gas flows with a high velocity and thus creates reduced pressure. The solid insert 326 may be held in position using support rod 328 that attaches the solid insert 326 to the top end of the inner tube 210. The support rod 328 may pass through the inner tube 210 and the solid insert 326 to hold the solid insert 326 firmly. In an example, several support rods 328 may be disposed at multiple positions around the solid insert 326 with spacing provided between them to allow inflow of gas. The solid insert 326 may be disposed so that it is adjacent to an inner slot 334 on the inner tube 210. The inner slot 334 may be fluidically connected to the narrow passage 330. In an example, there may be two inner slots 334 diametrically opposite to each other. The size of the inner slot 334 is such that it offers low resistance to fluid flow.

An outer tube 220 may be disposed on the distributor tray 140 concentric to the inner tube 210 forming an annular portion 342 therebetween. The outer tube 220 comprises slot 338 disposed on a bottom portion of the outer tube 220 and in contact with the distributor tray 140. The slot 338 allows liquid from the distributor tray 140 to enter the annular portion 342 between the outer tube 220 and the inner tube 210. In an example, two slots 338 may be disposed 180° from each other on a circumference of the outer tube 210. In another example, the slot 338 may be disposed at 90° from the first aperture 314 and the second aperture 318. As the liquid travels upward in the annular portion 342 and horizontally, for example, at 90°, around the circumference of the inner tube 210 in the annular region, most of the undesired particles or scales get settled on the distributor tray 140. This prevents clogging of the first aperture 314 or the second aperture 318. The sizes of the slot 338 and the diameter of the outer pipe 220 may be sized to provide calculated resistance for the liquid flow through the annular portion 342, depending on the capacity of the reactor 100.

A cover 346 may be disposed on top of the inner tube 210 inside outer tube 220 to cover the annular portion 342 while leaving the top end of the inner tube 210 open. The cover 346 may be for example of ring shape. In an example, the solid insert 326 may be attached to the cover 346. A cap plate 350 may be disposed on a support structure 354 disposed on the outer tube 220. The cap plate 350 covers the distributor unit 150 on the top. In an example, the support structure 354 may be metal rods or bars welded for holding the cap plate 350 in position above the outer tube 220. A gas inlet 358 may be disposed on the support structure 354 to allow gas to enter the distributor unit as shown by arrow 358.

During operation, liquid accumulates on the distributor tray 140 forming a liquid level 362. Gas enters the distributor unit 150 via the gas inlet 358 and enters the inner tube 210 via the narrow passage 330 (shown by dotted arrows in FIG. 3(*a*)). As the density of gas is low, the gas path volume is to be reduced to create a pressure drop that can lift the liquid in the annular portion 342. The use of solid insert 326 in the upper region of the inner pipe accomplishes this by creating the narrow passage 330. As a result, there is increase in liquid level inside the annular portion 342 compared to the liquid level on the distributor tray 140. Since the inner slot 334 is fluidically connected to the annular portion 342 and the narrow passage 330, the low pressure is transmitted to the annular portion 342 and causes a rise in the liquid in the annular portion 342 to an annular liquid level 366, because gas will not flow into the annular portion 342 as the high velocity in the narrow passage 330 causes low pressure in the narrow passage 330. The liquid in the annular portion 342 enters the inner tube 210 via the first aperture 314 (liquid flow is shown by solid arrows in FIG. 3(*a*)). The presence of the venturi insert 322 increases the mixing between the gas and liquid. In an example, if the annular liquid level 366 is high, the liquid may also enter the inner tube 210 via the second aperture 318. If the annular liquid level 366 rises further, the liquid may enter the inner tube 210 via a third aperture (not shown in the figure). Any number of apertures of any shape may be disposed on inner tube 210 to allow liquid to enter. It is preferred that the apertures are immersed in the liquid, otherwise the lower pressure in the annular portion 342 compared to the pressure in the inner tube 210, may not be maintained. For higher liquid flow rates, it is preferred that the liquid passes through the lower end of the inner slot 334. However, at the lower end of the inner slot 334, because they are close to the narrow passage 330, the low pressure in the annular portion 342 is not affected much even if they are not immersed in liquid. The location of the solid insert 326 allows for the low pressure region to be created just at the inner slot 334 and into the annular portion 342. This assures low pressure is directly delegated to the annular portion 342, without reducing the gas path too much. This is especially advantageous for relatively low gas flow rates.

For low liquid flow rates, the size of an aperture in conventional distributors is very small, which results in clogging of the liquid aperture for sludgy liquids. However, in the present subject matter, since the first aperture 314 is disposed on the inner pipe 210, which is located inside the outer pipe 220, the chances of clogging of the aperture is reduced as the particles settle on the tray rather than entering the inner pipe 210.

In an example, a pipe-piece structure 370 may be disposed below the first aperture 314 and the venturi insert 322. The pipe-piece is held in place by means of orifice plate 371. The pipe-piece structure 370 may be disposed on a bottom portion of the inner tube 210 above the orifice 310. The pipe-piece structure 370 also reduces a cross-sectional area of fluid flow. The shape of the pipe-piece structure 370 may be any shape that provides a constriction in the fluid flow path in the inner tube 210. The pipe-piece structure 370 is sized to provide calculated resistance to flow and shaped to provide a constriction in the path of fluid flow. The presence of this resistance to flow increases the liquid level in the annular portion 342 of the distributor unit 150. This resistance to liquid flow acts in series to the resistance caused by the first aperture 314 through which the liquid flows. The outlet of the pipe-piece structure 370 is shaped to splash the gas-liquid mixture onto the portion below. In a conventional distributor downpipe, for example in a chimney distributor, the minimum size of the aperture for liquid flow is about 6 mm. Further reduction in aperture size to increase resistance to liquid flow in case of low liquid flows is not recommended as it results in clogging of the aperture. The required resistance to flow in the present subject matter is provided by using resistance to flow in the inner tube 210 by sizing the pipe-piece structure 370 appropriately without clogging due to the reasons discussed above. In addition, some resistance to liquid flow may also be given by slot 338.

The level of liquid in the annular portion 342 is more stable compared to the liquid level outside the outer pipe 220 as it is controlled by the gas flow rate. Hence, the amount of liquid entering the inner tube 210 is more even, without much pulsing, or uneven flow, as the outer pipe 220 helps in dampening the liquid waves on the tray plate. This results in even flow of liquid into the inner tube 210 through the first aperture 314.

The liquid flow from the annular portion 342 to the inner tube 210 is only due to the liquid head in the annular portion 342 and not because of the low pressure within the inner tube 210, as there is no pressure difference within the inner tube 210 and the annular portion 342 because there is no or minimal flow of gas through the inner slot 334 As a result, the liquid flow is only due to the liquid head, which reduces the liquid flow through the second aperture 318 placed above the first aperture 314. This increases the operating range of distributor unit 150, as the apparatus 120 can operate either only through the first aperture 314 or through both the first aperture 314 and second aperture 318, without much deviation when liquid level passes above the first or second apertures 314 and 318.

As the liquid level depends on the gas flow through the narrow passage 330 and the resistance offered by the pipe-piece structure 370, when the distributor tray 140 is out of level, an increase in the liquid flow through a distributor unit 150 that is lower than another distributor unit 150, causes lower gas flow through the narrow passage 330, as the pressure drop across the plurality of distributor units 150 is same on a distributor tray 140. Because of the presence of the flow resistance due to the pipe-piece structure 370, when the distributor tray 140 is out of level, the distributor units 150 that are lower send more liquid, resulting in lower gas flow, as the overall pressure drop across the plurality of distributor units 150 is equal. This leads to less gas flow into the lower distributor unit 150, which causes less liquid level to be built up in the annular portion 342 resulting in lesser liquid flow. Hence, the distributor tray 140 has lower sensitivity to out-of-levelness.

FIG. 3(*b*) illustrates a top view of a section along the line A-A of the example distributor unit illustrated in FIG. 3(*a*), in accordance with an embodiment of the present subject matter. The outer tube 220 is disposed concentric to and outside the inner tube 210 forming the annular region 342. The solid insert 326 is disposed in the inner tube 210 forming the narrow passage 330 in the inner tube 210. The inner tube 210 has two inner slots 334 that open into the annular region 342.

FIG. 3(*c*) illustrates a top view of a section along the line B-B of the example distributor unit illustrated in FIG. 3(*a*), in accordance with an embodiment of the present subject matter. The first aperture 314 is disposed on the inner tube 210. Two slots 338 are disposed on the outer tube 220 such that the slots 338 are disposed 180° from each other on the circumference of the outer tube 220 and at 90° from the first aperture 314.

FIG. 3(*d*) illustrates an enlarged cross-sectional view of an example dispersion section 374, in accordance with an embodiment of the present subject matter. In an example, a dispersion section 374 may be disposed below the exit of the inner tube 210. The dispersion section 374 allows the exiting gas-liquid mixture to be spread out before entering the catalyst bed. The dispersion section 374 may comprise dispersion slots 378. The dispersion slots 378 may be placed at the exit of the inner tube 210. In one example, the width of the dispersion slots 378 may be such that it is equal to the space between them. An upper sieve plate 382 may be attached below the dispersion slots 378, such that there is a height h between the upper sieve plate 382 and the dispersion slots 378. A splash plate 384 may be placed on the upper sieve plate 382, such that the top of the splash plate 384 is at the same height h, above the top of the upper sieve plate 382.

The pipe-piece structure 370 may be shaped to direct fluids on the splash plate 384. The pipe-piece structure 370 is intended to be used along with splash plate 384. As the fluid mixture is directed by the pipe-piece structure 370, fluid hits the splash plate 384 dispersing liquid through dispersion slots 378. A part of the liquid is dispersed and passes through the dispersion slots 378. Another part of the liquid passes through the upper sieve plate 382 and is dispersed on a lower sieve plate 320 of larger diameter, where it is spread more widely. The lower sieve plate 320 has sieve plate wall 323 on the edges with sieve plate slots 324. This allows a certain amount of liquid to be held on the lower sieve plate 320, allowing uninterrupted flow of liquid FIG. 3(*e*) illustrates a top view of a section along the line C-C of the example distributor unit illustrated in FIG. 3(*d*), in accordance with an embodiment of the present subject matter. The splash plate 384 is disposed on the upper sieve plate 382 comprising sieve orifices 325.

FIG. 3(*f*) illustrates the top view of a section along the line D-D of the example distributor unit illustrated in FIG. 3(*d*), in accordance with an embodiment of the present subject matter. The lower sieve plate 320 comprises sieve plate slots 324 and lower sieve orifices 321. The lower sieve plate 320 allows the fluid to spread more before it enters the catalyst bed FIG. 4(*a*) illustrates another example distributor unit comprising the solid insert attached to the cap plate, in accordance with an embodiment of the present subject matter. The solid insert 326*b* is disposed within the inner tube 210. The top of the solid insert 326*b* may be removably attached to the cap plate 350, for example using bolts. This allows for replacing the solid insert as required, for processes or reactors that require varying gas flows. For example, for low gas flows, a sold insert 326*b* with a larger diameter may be used. The dispersion section 374 may be disposed below the exit of the inner tube 210.

FIG. 4(*b*) illustrates a top view of a section along the line A-A of the example distributor unit illustrated in FIG. 4(*a*), and FIG. 4(*c*) illustrates a top view of a section along the line B-B of the example distributor unit illustrated in FIG. 4(*a*), in accordance with an embodiment of the present subject matter. Referring to FIG. 4(*b*), the solid insert 326*b* may be disposed within the inner tube 210. The inner tube 210 has two inner slots 334. The outer tube 220 is disposed concentric to and outside the inner tube 210. Referring to FIG. 4(*c*), the first aperture 314 is disposed on the inner tube 210. Two slots 338 are disposed on the outer tube 220 such that the slots 338 are disposed 180° from each other on the circumference of the outer tube 220 and at 90° from the first aperture 314.

FIG. 4(*d*) illustrates another example distributor unit comprising a static mixer, in accordance with an embodiment of the present subject matter. In another example, the pipe-piece structure 370 may be disposed below the first aperture 314 and a static mixer 322*b*. In an example, the static mixer 322*b* may comprise twisted ribbons. Any other static mixers known in the art may be used. The inlet to the static mixer 322*b* is placed such that the liquid from the first aperture 314 enters in each of the openings of the static mixer 322 and mixes with the incoming gas in a series of rotations. The thickness of the ribbon of the static mixer 322*b* may be varied so that there is no significant pressure loss because of the static mixer 322*b*. The static mixer 322*b* may be placed near an exit of the inner tube 210 to create a swirling motion of the gas-liquid mixture exiting the inner tube 210.

The pipe-piece structure 370 may be disposed on a bottom portion of the inner tube 210 above the orifice 310. The pipe-piece structure 370 reduces a cross-sectional area of fluid flow. The shape of the pipe-piece structure 370 may be any shape that provides a constriction in the fluid flow path in the inner tube 210. The pipe-piece structure 370 is sized to provide calculated resistance to flow and shaped to provide a constriction in the path of fluid flow. The presence of this resistance to flow increases the liquid level in the annular portion 342 of the distributor unit 150. This resistance to liquid flow acts in series to the resistance caused by the first aperture 314 through which the liquid flows. The outlet of the pipe-piece structure 370 is shaped to splash the gas-liquid mixture onto the portion below. In a conventional distributor downpipe, for example in a chimney distributor, the minimum size of the aperture for liquid flow is about 6 mm. Further reduction in aperture size to increase resistance to liquid flow in case of low liquid flows is not recommended as it results in clogging of the aperture. The required resistance to flow in the present subject matter is provided by using resistance to flow in the inner tube 210 by sizing the pipe-piece structure 370 appropriately. In addition, the required resistance to liquid flow may also be given by slot 338.

FIG. 5(*a*) illustrates a cross-sectional view of another embodiment of the distributor unit comprising one tube, in accordance with an embodiment of the present subject matter. In another embodiment, the distributor unit 500 comprises a tube 510 disposed on an orifice 514 on a distributor tray 140. A first aperture 518 may be disposed on a lower portion of the tube 510 near the distributor tray 140 to allow liquid to enter the distributor unit 500. In an example, there may be two first apertures 518 disposed at 180° from each other on a circumference of the tube 510 at the same height. A solid insert 522 may be disposed within the tube 510 so that a lower portion of the solid insert 522 is adjacent to the first aperture 518. The lower portion of the solid insert 522 may have corrugated edges 526 and an upper portion of the solid insert 522 may be hemispherical or may have rounded edges 530. The solid insert 522 may be held in position using support rod 528 that attaches the insert to the tube 510. The support rod 528 may pass through the tube 510 and solid insert 522 to hold the insert 522 firmly. The support rod 528 may be present at multiple positions around the solid insert 522 while leaving sufficient space for allowing flow of gas and liquid. A cap plate 534 may be disposed on a support structure 538, the support structure 538 being disposed on the tube 510. A gas inlet 542 may be disposed on the support structure 538 to allow gas to enter the distributor unit 500. The distributor unit 500 may comprise a second aperture 546 disposed on a portion of the tube 510 above the first aperture 518. The second aperture 546 allows liquid to enter the tube 510. A top slot 550 may be disposed near a top portion of the tube 510 to allow liquid to enter the tube in cases where the liquid level 554 on the distributor tray 140 becomes high or increased flow conditions.

In an example, the first aperture 518 may be disposed 1 to 4 inches above the distributor tray 140. The first and second apertures 518 and 546 may be sized as to offer required resistance to liquid flow, depending on the operational characteristics of the reactor. The solid insert 522 effectively reduces the flow path, creating a passage 562 between the solid insert 522 and the tube 510. The feed gas passes through the passage 562 at high velocity creating low pressure in the region. Liquid from the distributor tray 140 is pulled to this low pressure region and the corrugated edges 526 result in increased mixing with the gas.

An orifice insert 558 may be disposed at the exit of the tube 510, which reduces the flow area, thereby enhancing mixing of gas and liquid. In an example, the orifice insert 558 may be disposed 1 to 3 inches below the solid insert 522. In an example, the orifice 514 may be part of the orifice insert 558, and in this case the orifice 514 may be disposed higher or lower in the tube 510 and may be different from a tray orifice where the tube 510 is attached to the tray 140. In another example, a venturi insert may be disposed below the first aperture 518. In an example, the dispersion section 374 as discussed above may be disposed below the exit of the tube 510. The distributor tray 140 comprising a plurality of distributor units 500 may used to distribute a gas-fluid mixture in a reactor.

Figures 5A, 5B:
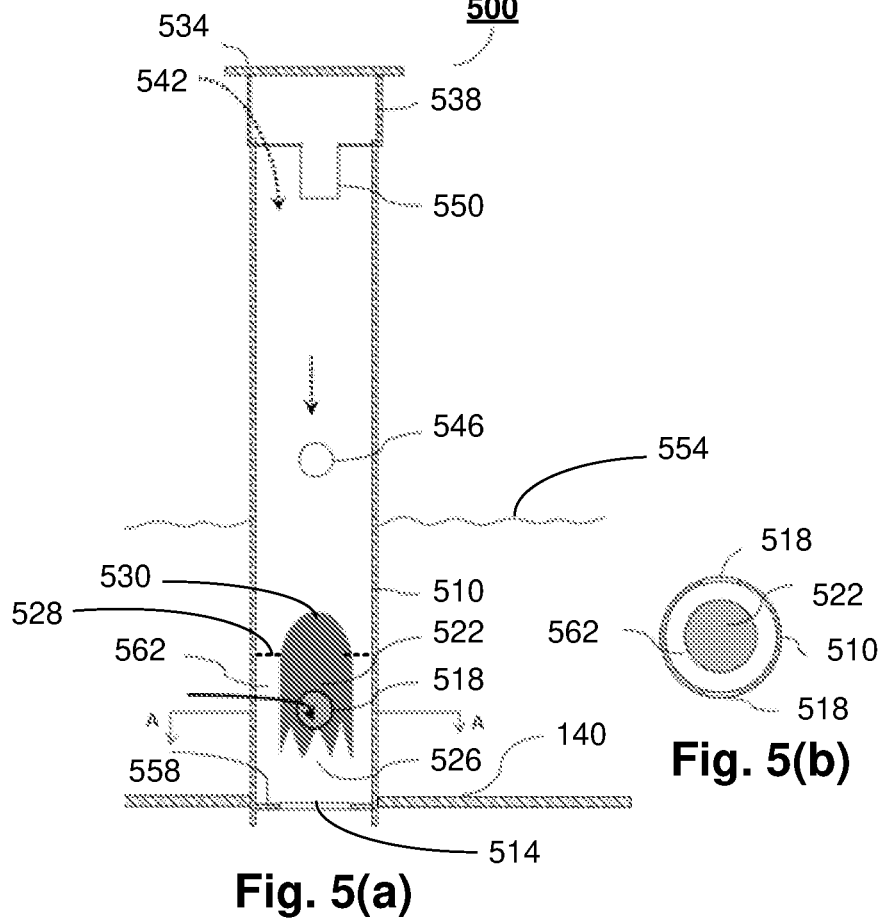
FIG. 5(*a*) illustrates a cross-sectional view of another embodiment of the distributor unit comprising one tube, in accordance with an embodiment of the present subject matter.

FIG. 5(b) illustrates a top view of a section along line A-A of the example distributor unit shown in FIG. 5(a), in accordance with an embodiment of the present subject matter. The solid insert 522 is adjacent to the two first apertures 518, the two first apertures 518 disposed at 180° from each other on the circumference of the tube 510.

During operation, the low pressure in the passage 562 causes liquid to be pulled into the tube 510 via the first aperture 518. As a result, the driving force for liquid flow is increasing gas velocity compared to liquid head above the tray 140. This can help in providing a lower requirement of the height of the distributor unit 500 for the same sensitivity to out-of-levelness.

The volumetric flow rate of liquid is given by $$Q_L = f(H^{0.5}) + g(Q_G)$$

Where, H=liquid height above the lowest aperture,
$Q_L$=is volumetric liquid flow rate
$Q_G$=volumetric gas flow rate
$f(H^{0.5})$ is a function of $h^{0.5}$
$g(Q_L)$ is an another function of $Q_L$
When the tray 140 is out-of-level, the lower distributor unit passes more liquid due to the increased height. This causes less gas to flow through that particular distributor unit, which in turn lowers the amount of liquid passing through the distributor unit as the pressure drop is reduced due to lower gas flow. Thus, as the liquid flow depends on increasing gas velocity, the distributor apparatus has lower sensitivity to out of levelness.

EXAMPLES

The disclosure will now be illustrated with working examples, which are intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

Example 1

The following is to illustrate the advantage of using the solid insert 326 in the distributor unit 150 comprising the inner tube 210 and the outer tube 220. This was compared to a conventional distributor tray without a chimney distributor unit. The distributor trays are subject to be out-of-level with the horizontal, such that the higher distributor is 1 cm above the lower distributor. The sensitivity due to 1 cm out of levelness is defined as:

$$\% \text{ Sensitivity}_{lq}^{1\,cm} = \frac{(Q_{low} - Q_{high})}{(Q_{low} + Q_{high})/2} * 100\%$$

$$QL = f(H^{0.5}) + g(Q_G)$$

where, $Q_{low}$ is volumetric liquid flow through lower distributor unit, and $Q_{high}$ is volumetric liquid flow rate through higher distributor unit.

Table 1 shows a comparison of the sensitivity to out of levelness of the distributor apparatus of the present subject matter and conventional apparatus. The sensitivity to out of levelness at high flow rate and low flow rate is the least with the distributor unit of the present subject matter. The addition of the solid insert 326 and the additional resistances, such as venturi insert 370, reduces the sensitivity further.

TABLE 1

| Comparison of sensitivity to out of levelness of different distributor apparatus. | | |
|---|---|---|
| | Sensitivity at 0.8 cm/s (%) | Sensitivity at 0.4 cm/s (%) |
| Distributor unit without solid insert and venturi insert | 6.9 | 20 |
| Distributor unit with solid insert at upper region | 4.5 | 15 |
| Distributor unit with solid insert at upper region and orifice or other pressure resistances in inner tube below liquid inlet. | 3.1 | 8 |

Example 2

The following is to illustrate the different benefits of the distributor unit 150 with an inner tube 210 and outer tube 220, is compared with a conventional chimney distributor. The distributor trays are subjected to be out of level with the horizontal, such that the higher distributor is 1 cm above the lower distributor. The sensitivity due to 1 cm out of levelness is defined as $$\% \text{ Sensitivity}_{lq}^{1\,cm} = \frac{(Q_{low} - Q_{high})}{(Q_{low} + Q_{high})/2} * 100\%$$

where, $Q_{low}$ is volumetric liquid flow through lower distributor unit, and $Q_{high}$ is volumetric liquid flow rate through higher distributor unit. Low value of sensitivity indicated better performance in uneven conditions of liquid depth on the tray.

Figure 6:
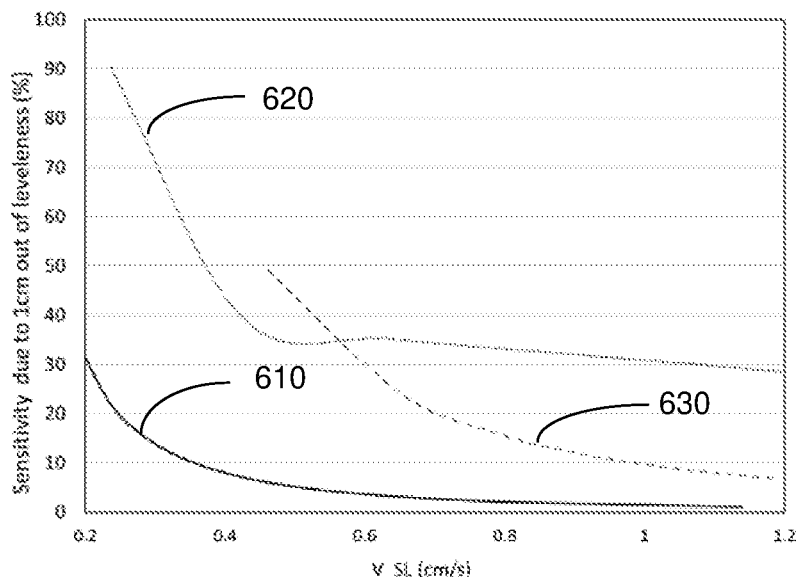
FIG. 6 illustrates the variation in sensitivity with superficial velocity for example 2, in accordance with an embodiment of the present subject matter.

FIG. 6 illustrates the variation in sensitivity with superficial velocity for example 2, in accordance with an embodiment of the present subject matter. The operational superficial velocity of liquid in typical hydroprocessing reactors ranges between 0.3 to 1.2 cm/s. The solid line 610 is for the distributor unit 150 of the present subject matter, the dotted line 620 is for a standard chimney distributor with a slot opening. The dashed line 630 shows sensitivity for a conventional chimney distributor with two apertures. The figure shows limit of less than 20% above flow of 0.3 cm/s for the distributor unit 150, which is better than the acceptable limit of 20%. This is achieved, due to combined effect of using the solid insert 326 and additional inserts, such as the venturi insert 322 and the pipe-piece structure 370 to give calculated resistance to flow in the inner tube 210. In contrast, the conventional distributor does not achieve a sensitivity below 20% for any flow rate and the distributor with two apertures achieves it only at high flow rates above about 0.7 cm/s Example 3

Two distributors were compared to illustrate the advantage of having liquid flow depend on gas velocity in addition to the static liquid head. Table 2 shows the values of sensitivity and liquid height for a conventional chimney distributor compared to the distributor unit 500 comprising tube 510. Equalizing the sensitivity, it can be seen that the distributor unit 500 of the present disclosure has liquid height of 3 cm compared to the conventional chimney distributor. The additional height can be utilized for catalyst bed.

$$Q_L = f(H^{0.5}) + g(Q_G)$$

TABLE 2

Comparison of sensitivity to out of levelness of a conventional distributor and a distributor of the present disclosure with one tube.

| | Sensitivity at 0.5 cm/s (%) | Liquid height for 0.5 cm/s distributor (cm) |
|---|---|---|
| Chimney distributor | 5 | 8 cm |
| Distributor with one tube of present disclosure | 4.9 | 3 cm |

Although embodiments of the present subject matter are described in language specific to structural features, it is to be understood that the specific features and methods are disclosed as example embodiments for implementing the claimed subject matter.

We claim:

1. An apparatus (120) for distributing a polyphasic fluid mixture to a catalyst bed in a downflow reactor (100), the apparatus (120) comprising a distributor tray (140) comprising a plurality of distributor units (150), wherein the distributor unit (150) comprises:
    an inner tube (210) disposed on an orifice (310) in the distributor tray (140), wherein the inner tube (210) comprises:
    an at least one first aperture (314) disposed on a portion on the inner tube (210) to allow liquid to enter the inner tube (210); and
    a solid insert (326) disposed in a top portion of the inner tube (210), wherein the solid insert (326) forms a narrow passage (330) in the top portion of the inner tube (210) to allow gas to pass through;
    an outer tube (220) disposed on the distributor tray (140) concentric to the inner tube (210), wherein the outer tube (220) comprises:
    a slot (338) disposed on a bottom portion of the outer tube (220), wherein the slot (338) is to allow liquid from the distributor tray (140) to enter an annular portion (342) between the inner tube (210) and the outer tube (220);
    a cover (346) disposed on a top portion of the inner tube (210) inside the outer tube (220) to enclose the annular portion (342) on the top;
    a cap plate (350) disposed on a support structure (354) disposed on the outer tube (220); and
    a gas inlet (358) provided in the support structure (345) to allow gas to enter the distributor unit (150).

2. The apparatus (120) as claimed in claim 1, wherein the inner tube (210) comprises an at least one second aperture (318) disposed on a portion of the inner tube (210) above the at least one first aperture (314).

3. The apparatus (120) as claimed in claim 1, wherein the at least one first aperture comprising two first apertures (314), wherein the two first apertures (314) are disposed 180° from each other on a circumference of the inner tube (210).

4. The apparatus (120) as claimed in claim 2, wherein the at least one second aperture comprising two second apertures (318), wherein the two second apertures (318) are disposed 180° from each other on the circumference of the inner tube (210).

5. The apparatus (120) as claimed in claim 1 comprising two slots (338) disposed 180° from each other on a circumference of the outer tube (220).

6. The apparatus (120) as claimed in claim 1, wherein the slot (338) is disposed at 90° from the at least one first aperture (314).

7. The apparatus (120) as claimed in claim 1, wherein a bottom portion of the inner tube (210) above the orifice (310) comprises a venturi insert (322), wherein the venturi insert (322) reduces a cross-sectional area of fluid flow.

8. The apparatus (120) as claimed in claim 7 comprising a pipe-piece structure (370) disposed below the venturi insert (322).

9. The apparatus (120) as claimed in claim 1, wherein the inner tube (210) comprises an inner slot (334) fluidically connecting the narrow passage (330) in the inner tube (210) and the annular portion (342) between the inner tube (210) and the outer tube (220).

10. The apparatus (120) as claimed in claim 9, wherein the inner tube (210) comprises two inner slots (334) diametrically opposite to each other.

11. The apparatus (120) as claimed in claim 1 comprising a dispersion section (374) disposed at an exit of the inner tube (210).

12. The apparatus (120) as claimed in 11, wherein the dispersion section (374) comprises dispersion slots (378), an upper sieve plate (382), and a splash plate (384).

13. A reactor (100) comprising the apparatus (120) as claimed in claim 1.

14. An apparatus (120) for distributing a polyphasic fluid mixture to a catalyst bed, the apparatus (120) comprising a distributor tray (140) comprising a plurality of distributor units (500), wherein the distributor unit (500) comprises:
    a tube (510) disposed on an orifice (514) on the distributor tray (140);
    an at least one first aperture (518) disposed on a lower portion of the tube (510) near the distributor tray (140) to allow liquid to enter the distributor unit (500);
    a solid insert (522) disposed within the tube (510) such that a lower portion of the solid insert (522) is adjacent to the first aperture (518), and
    wherein,
    the lower portion of the solid insert (522) has corrugated edges (526), and
    an upper portion of the solid insert (522) has rounded edges (530);
    a cap plate (534) disposed on a support structure (538) disposed on the tube (510); and
    a gas inlet (542) disposed on the support structure (538) to allow gas to enter the distributor unit (500).

15. The apparatus (120) as claimed in claim 14 comprising an at least one second aperture (546) disposed on a portion of the tube (510) above the at least one first aperture (518), wherein the second aperture (546) is to allow liquid to enter the tube (510).

16. The apparatus (120) as claimed in claim 14 comprising a top slot (550) disposed near a top portion of the tube (510) to allow liquid to enter the tube (510).

17. The apparatus (120) as claimed in claim 14, wherein the at least one first aperture (518) is disposed 1 to 4 inches above the distributor tray (140).

18. The apparatus (120) as claimed in claim 14 comprising a venturi insert (558) disposed near an exit of the tube (510).

19. The apparatus (120) as claimed in claim 14, wherein the at least one first aperture comprising two first apertures (518) disposed at 180° from each other on a circumference of the tube (510).

20. A reactor (100) comprising the apparatus (120) as claimed in claim 14.

* * * * *